United States Patent
Bendix et al.

(10) Patent No.: US 11,147,305 B2
(45) Date of Patent: Oct. 19, 2021

(54) FOOD PREPARATION DEVICE FOR SEALING TOGETHER TWO PIECES OF BREAD

(71) Applicant: Sveadanerna Food AB, Nyköping (SE)

(72) Inventors: Lars Bendix, Randers NÖ (DK); Håkan Johan Löfholm, Huddinge (SE)

(73) Assignee: Sveadanerna Food AB, Nyköping (SE)

( * ) Notice: Subject to any disclaimer, the term of this patent is extended or adjusted under 35 U.S.C. 154(b) by 404 days.

(21) Appl. No.: 16/314,113

(22) PCT Filed: Feb. 14, 2018

(86) PCT No.: PCT/SE2018/050136
§ 371 (c)(1),
(2) Date: Dec. 28, 2018

(87) PCT Pub. No.: WO2018/160116
PCT Pub. Date: Sep. 7, 2018

(65) Prior Publication Data
US 2019/0230975 A1 Aug. 1, 2019

(30) Foreign Application Priority Data
Feb. 28, 2017 (SE) .................. 1750215-4

(51) Int. Cl.
*A23P 20/20* (2016.01)
*A21D 13/32* (2017.01)
(Continued)

(52) U.S. Cl.
CPC .............. *A23P 20/20* (2016.08); *A21D 13/32* (2017.01); *A23P 30/10* (2016.08); *A47J 37/01* (2013.01);
(Continued)

(58) Field of Classification Search
CPC ........ A47J 37/01; A47J 37/06; A47J 37/0611; A47J 37/0864; A47J 37/015;
(Continued)

(56) References Cited

U.S. PATENT DOCUMENTS 3,869,973 A * 3/1975 Quitman .............. A47J 37/0611
99/426
4,459,770 A * 7/1984 Brenot .................... D06F 71/34
38/34
(Continued)

FOREIGN PATENT DOCUMENTS

| CN | 2200921 Y | 6/1995 |
|---|---|---|
| CN | 1120306 A | 4/1996 |

(Continued)

OTHER PUBLICATIONS

Extended European Search Report issued in corresponding European Patent Application No. 18761589.3 dated Jul. 29, 2020, consisting of 5 pages.
(Continued)

*Primary Examiner* — Phuong T Nguyen
(74) *Attorney, Agent, or Firm* — Christopher & Weisberg, P.A.

(57) ABSTRACT

A food preparation device and a bread mold. The food preparation device includes a bottom unit for accommodating a first piece of bread and a top unit for accommodating a second piece of bread. The bottom and the top units each have a flat edge extending outwardly the circumference of the bottom unit respectively the circumference of the top unit. The flat edge of the first piece of bread and the flat edge of the second piece of bread are provided with an edible and organic adhesive layer, for enabling the sealing together of the two pieces of bread along the flat edges when moving the
(Continued)

top unit from the open position to a closing position, thereby avoiding leakage before consumption.

6 Claims, 3 Drawing Sheets

(51) Int. Cl.
*A23P 30/10* (2016.01)
*A47J 37/08* (2006.01)
*A47J 37/06* (2006.01)
*A47J 37/01* (2006.01)

(52) U.S. Cl.
CPC ............ *A47J 37/06* (2013.01); *A47J 37/0611* (2013.01); *A47J 37/0864* (2013.01)

(58) Field of Classification Search
CPC ... A47J 2037/0617; A23P 20/20; A23P 30/10; A21D 13/32
USPC ......... 99/349, 351, 354, 372, 374–377, 379, 99/380–384, 426, 427, 428, 439, 441–442
See application file for complete search history.

(56) References Cited

U.S. PATENT DOCUMENTS

| | | |
|---|---|---|
| 5,800,853 A | 9/1998 | Wang |
| 6,231,898 B1 | 5/2001 | Perrine |
| 6,397,730 B1 | 6/2002 | Steinbach et al. |
| 2007/0144359 A1 | 6/2007 | Ekberg et al. |
| 2012/0160110 A1 | 6/2012 | Gursel |
| 2013/0344214 A1 | 12/2013 | Tong |
| 2015/0164274 A1* | 6/2015 | Jinzhao ................ A47J 37/015 99/372 |

FOREIGN PATENT DOCUMENTS

| | | | |
|---|---|---|---|
| CN | 101990920 A | 3/2011 | |
| CN | 205006689 U | 2/2016 | |
| CN | 106108719 A | 11/2016 | |
| EP | 1 676 481 A1 | 7/2006 | |
| FR | 2 521 419 A3 | 8/1983 | |
| GB | 1162640 A | 8/1969 | |
| KR | 101800800 B1 | 12/2017 | |
| WO | 1994/09644 A1 | 5/1994 | |
| WO | 2005034698 A1 | 4/2005 | |
| WO | 2008118965 A1 | 10/2008 | |
| WO | 2017/066812 A1 | 4/2017 | |

OTHER PUBLICATIONS

Chinese Office Action and Search Report together with English translation of same issued in corresponding Chinese Patent Application No. 201880004788.X dated Nov. 18, 2020, consisting of 13 pages.
International Search Report and Written Opinion dated Apr. 11, 2018 and issued in corresponding PCT Application No. PCT/SE2018/050136, consisting of 14 pages.
Chinese Office Action and Search Report together with English translation of same issued in corresponding Chinese Patent Application No. 201880004788.X dated Jun. 2, 2021, consisting of 15 pages.

* cited by examiner

FOOD PREPARATION DEVICE FOR SEALING TOGETHER TWO PIECES OF BREAD

CROSS-REFERENCE TO RELATED APPLICATIONS

This application is a Submission Under 35 U.S.C. § 371 for U.S. National Stage Patent Application of International Application Number: PCT/SE2018/050136, filed Feb. 14, 2018 entitled "A FOOD PREPARATION DEVICE FOR SEALING TOGETHER TWO PIECES OF BREAD," which claims priority to Swedish Application No. 1750215-4, filed Feb. 28, 2017, entitled "A FOOD PREPARATION DEVICE FOR SEALING TOGETHER TWO PIECES OF BREAD" the entirety of both of which are incorporated herein by reference.

TECHNICAL FIELD

The present invention relates to a food preparation device for sealing together two pieces of bread and to a bread mold for the preparation of the two pieces of bread suitable for using in the food preparation device.

BACKGROUND

Sealed sandwich makers are known in the art. The sandwich is typically made by filling the space between two pieces of bread with various ingredients such as fillings, vegetables, meat etc. The edges of the bread are then sealed together under force such that the inner ingredients do not leak out. In conventional sandwich makers the bread is sealed between two metal plates that cooperate with one another via a hinge. Due to this application of force, however, the metal plates also apply a lateral force to the bread pieces, which causes the bread pieces to move relative to one another. When the bread pieces are out of alignment, the peripheries of the bread pieces are unevenly sealed, creating an inadequate seal between the pieces and thereby leading to ingredient leakage. Therefore, there is a need in the art for a sandwich maker that ensures the bread pieces are aligned during sealing to ensure that the content of the sandwich does not leak.

SUMMARY

In accordance with an aspect of the present invention, there is provided a food preparation device for sealing two pieces of bread together. The food preparation device comprises a bottom unit for accommodating the first piece of bread having the same form as the bottom unit; a top unit for accommodating the second piece of bread having the same form as the top unit; the bottom unit and the top unit each comprising a flat edge extending outwardly the circumference of the bottom unit respectively the circumference of the top unit, the top unit being movable from an open position to a closing position for enabling the sealing together of the two pieces of bread along a flat edge of the first piece of bread and a flat edge of the second piece of bread, wherein the flat edge of the first piece of bread and the flat edge of the second piece of bread are provided with an edible and organic adhesive layer, for enabling the sealing together of the two pieces of bread along the flat edges when closing the top unit over the bottom unit, thereby avoiding the edible filling content of the sealed bread to leave the sealed bread before consumption.

According to another aspect herein, there is provided a bread mold comprising a first bread mold piece and a second bread mold piece, the two bread mold pieces being attached together along one side of the bread mold by means of a hinge, wherein the first bread mold piece comprises a base and a flat edge extending outwardly the circumference of the base, for accommodating a first piece of bread having the same form as the first bread mold piece; and wherein the second bread mold peace comprises a base and a flat edge extending outwardly the circumference of the base, for accommodating a second piece of said bread having the same form as the second bread mold piece, wherein the hinge enables the closing or folding together of the two bread mold pieces along the flat edges in such a way as the two pieces of bread are adequately aligned along the flat edges.

According to another aspect herein, there is provided a sandwich comprising a first piece of bread and a second piece of bread similar to the first piece of bread, wherein each piece of bread comprises a bottom unit surrounded by a flat edge extending outwardly the circumference of the bottom unit(s) and said flat edges are provided with an edible and organic adhesive layer for enabling the sealing together of the two pieces of bread along the flat edges during preparation of the sandwich in the food preparation device according to the present invention.

An advantage with the food preparation device according to the present invention is that the resulting sandwich is sealed avoiding the content to leak. Hence all flavor of the content is maintained. Further, the cleaning of the device is less cumbersome as the surfaces in contact with the pieces of bread during operation are free from the inner content of the resulting sandwich.

Another advantage is that the pieces of bread are correctly aligned during the sealing process, leading to an adequate sealing.

Other advantages and a fuller understanding of the invention will be clear from the following detailed description and the accompanying drawings.

DETAILED DESCRIPTION

The present invention relates to a food preparation device and, in particular, to a sandwich maker for making sealed sandwiches.

Figure 1A:
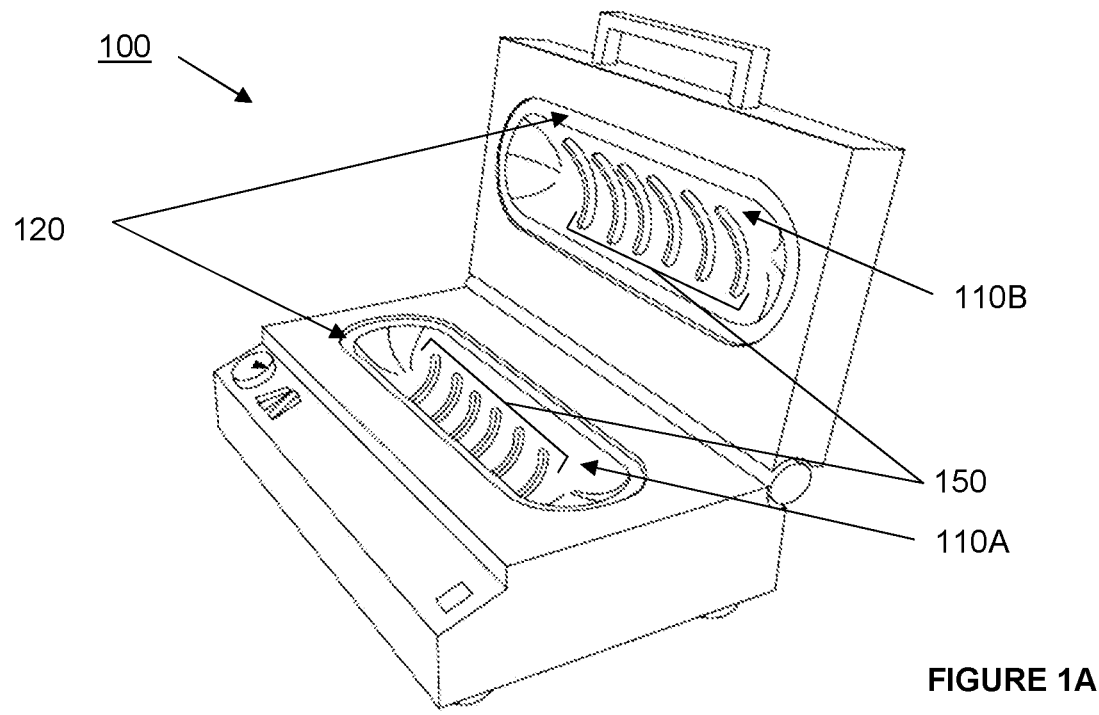
FIG. 1A illustrates a side view of the food preparation device according to the present invention.
Figure 1B:
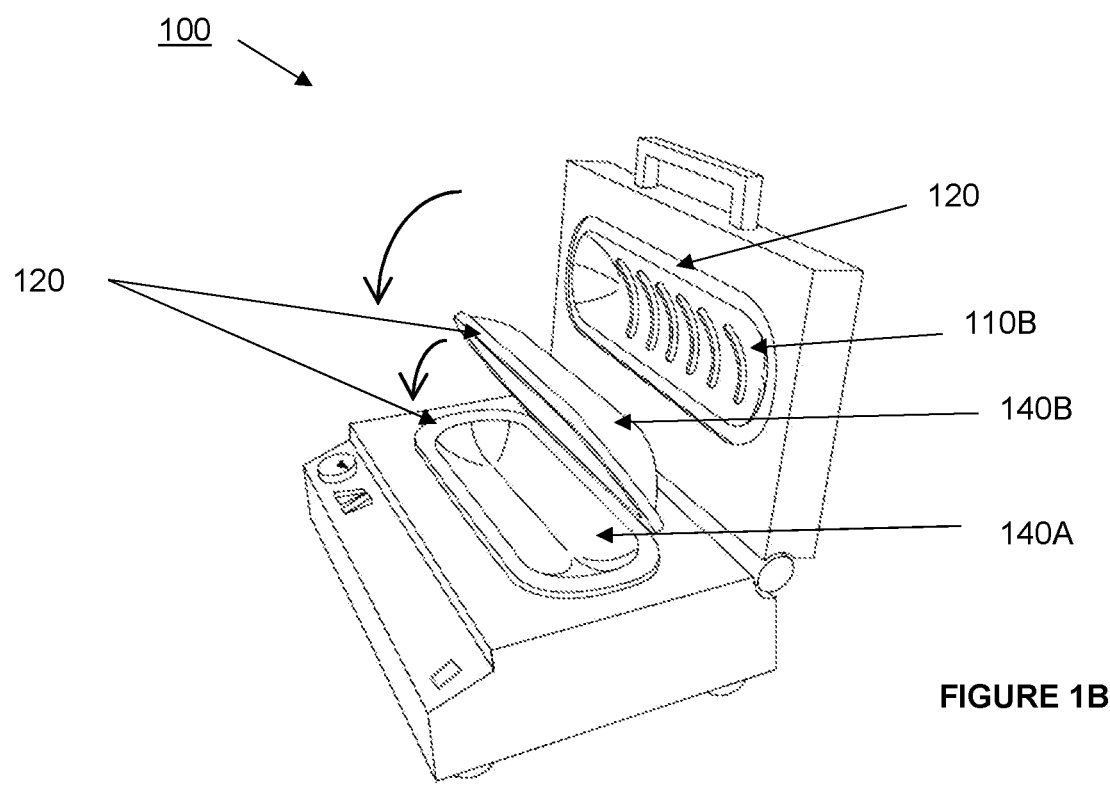
FIG. 1B illustrates a side view of the food preparation device including the two pieces of bread according to the present invention.

Referring to FIGS. 1A-1B there is illustrated a food preparation device 100 according to the present invention.

Figure 5:
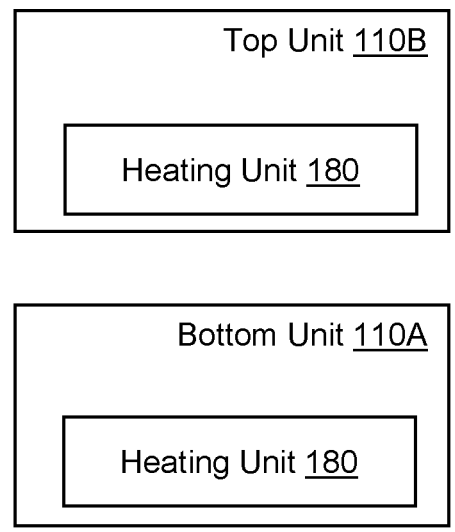
FIG. 5 illustrates an example top unit including a heating unit and an example bottom unit including a heating element.

The food preparation device 100 comprises a bottom unit 110A for accommodating a first piece of bread 140A (see FIG. 2) having the same form as the bottom unit 110A. The device 100 further comprises a top unit 110B for accommodating a second piece of bread 140B (see FIG. 2) having the same form as the top unit 110B. Both the top unit 110B and the bottom unit 110A are each provided with at least one heating unit or heating element (not shown) 180 (see FIG. 5). Further, the bottom unit 110A and the top unit 110B each comprises a flat edge 120 extending outwardly the circumference of the bottom unit 110A respectively the circumference of the top unit 110B. The top unit 110B is movable from an open position to a close position, as shown in FIG. 1B, for enabling the sealing together of the two pieces of bread 140, 140B along a flat edge 120 of the first piece of bread 140A and a flat edge of the second piece of bread 140B. It should be noted that the dimension of the flat edge 120 of the pieces of bread is similar to the flat edge 120 of the top respective bottom units 110B, 110A, thereof the same referral number 120. The bottom unit 110A and the top unit 110B of the food preparation device 100 are made of a durable non-adhesive material, such as metal provided, for example, with a non-stick Polytetrafluoroethylene (PTFE) coating (e.g. Teflon) resistant to high temperature e.g. up to 350 degrees or at least 200 degrees. Such material is easy to clean. As shown the units 110A and 110B comprises groves. The flat edges 120 of the two pieces of bread are provided with an edible and organic adhesive layer (like egg or flour) for enabling the sealing together of the two pieces of bread 140A, 140B, during preparation, thereby avoiding an edible content of the sealed bread to leave the bread during the preparation of the sandwich or the baked bread. Hence, before consumption of the prepared sandwich, no leakage occurs. This is advantageous since the cleaning of the inner part of the device 100 is less cumbersome as the surfaces in contact with the pieces of bread during operation are free from the inner content of the resulting sandwich.

Also, the edible content is intact and is not absorbed by the bread. The edge of each piece of bread 140A, 140B, may be baked very lightly before using the device 100. In this way the proteins inside the bread do not dry out and therefore may glue together when toasted under pressure in the food preparation device 100. Hence, to strengthen the gluing or adhesive operation, the organic layer, like egg or flour is used to cover the edges 120 of the pieces of bread 140A, 140B. The width of the edge 120 is at least 0.5 cm and preferably no more than 3 cm. However this is a design parameter. It is understood that the device 100 is provided with an electrical power unit or power cord which can be connected to a power outlet or the like for the heating of the heating elements. The device 100 is also provided with a knob that is used to regulate the temperature or to vary the electrical output to the heating elements. The device 100 may also include additional features which are not described in details, e.g. a display, additional knobs, light indicators, etc.

Figure 4:
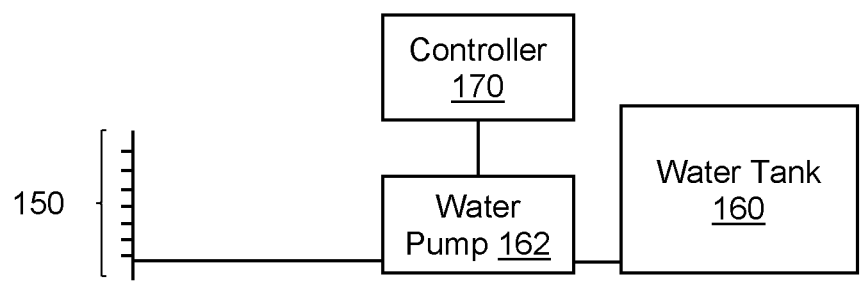
FIG. 4 illustrates an example water tank, water pump, controller, and plurality of openings.

According to an embodiment, the top unit 110B and the bottom unit 110A each comprises a plurality of p(small) perforations or holes (not shown) 150 evenly distributed over the surface of the top unit 110B respectively of the bottom unit 110A. The food preparation device 100 further comprises a water tank (not shown) 160 (see FIG. 4) for storing water and at least one water pump (not shown) 162 connected to the water tank 160 and used to deliver a spray of water through the holes 150 of the top unit 110B and the bottom unit 110A. The water is sprayed through the holes 150 in a controlled manner. This can be done automatically or manually by means of control means, i.e., a controller 170 (see FIG. 4). The control means may be a button on the device which when pushed, the water is sprayed over the outer layers of the pieces of bread. The control means may also be programmed to perform automatic spraying without involvement of the user of the device 100. The spraying may be performed at regular intervals during the preparation of the bread or sandwich. This has the advantage that the top layer of the pieces of bread 140A, 140B gets crispy. It should be noted that the water may be led through a plurality of rubber (or plastic) or metal hoses, connected to the water pump 162, for achieving the spray operation described above. For example, each end of a hose may act as a shower during the spraying. The water tank 160 also comprises an inlet through which water is filled into the tank 160.

It should also be noted that the water tank 160 (and pump 162) is located in such a way that it is separated from any heating element of the device 100. This means that the sprayed water does not evaporate due to the high temperature of the heating elements during operation.

According to an embodiment, the water tank 160 and the water pump 162 may be a separate unit which is not integrated in the feed preparation device 100. Instead it is connected to the device 100. According to another embodiment, the top part and the bottom part of the device 100 may be provided with an own water tank 160 and pump 162 (and hoses) for separate spraying operations.

Figure 2:
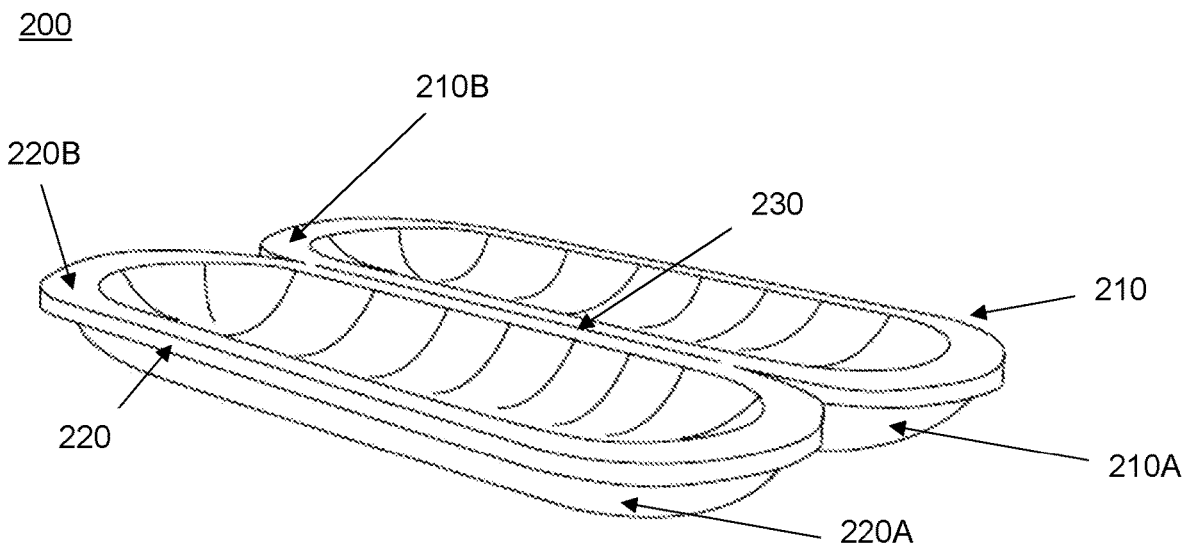
FIG. 2 illustrates a bread mold suitable for use to prepare the two pieces of bread according to an embodiment herein.

Referring to FIG. 2 there is illustrated, according to an embodiment herein, a bread mold 200 which may be used for the preparation of the bread including the two pieces of bread. The mold is suitable to use in an oven or in a microwave oven. The mold may be made of metal or any suitable material that is resistant to heat (e.g. at least 200 degrees or more) in the oven such as Teflon. Baking of the sandwich may be performed using the mold before placing the beaked pieces of bread in the food preparation device 100. As shown, the mold 200 comprises a first bread mold piece 210 and a second bread mold piece 220, the two bread mold pieces 210, 220 being attached together along one side of the bread mold 200 by means of a hinge 230. The first bread mold piece 210 comprises a base 210A and a flat edge 210B extending outwardly the circumference of the base 210A, for accommodating a first piece of bread 140A having the same form as the first bread mold piece (210). The second bread mold peace 220 comprises a base 220A and a flat edge 220B also extending outwardly the circumference of the base 220A for accommodating a second piece of said bread 140B having the same form as the second bread mold piece 220. The hinge hinge 230 enables the closing together of the two bread mold pieces 210, 220 along the flat edges 120. Each of the flat edges 120 has a width between 0.5 com and 3 cm, i.e. equal to the dimension of the edges 120 of the device 100.

According to an embodiment, each base 220A, 220B of the bread mold comprise a plurality of (small) perforations or holes evenly distributed over the surface of bases 220A, 220B. This allows water to be manually sprayed over the top layer respectively the bottom layer of the two pieces of bread. The water spraying may be performed using a spray bottle provided with a pump.

Figure 3:
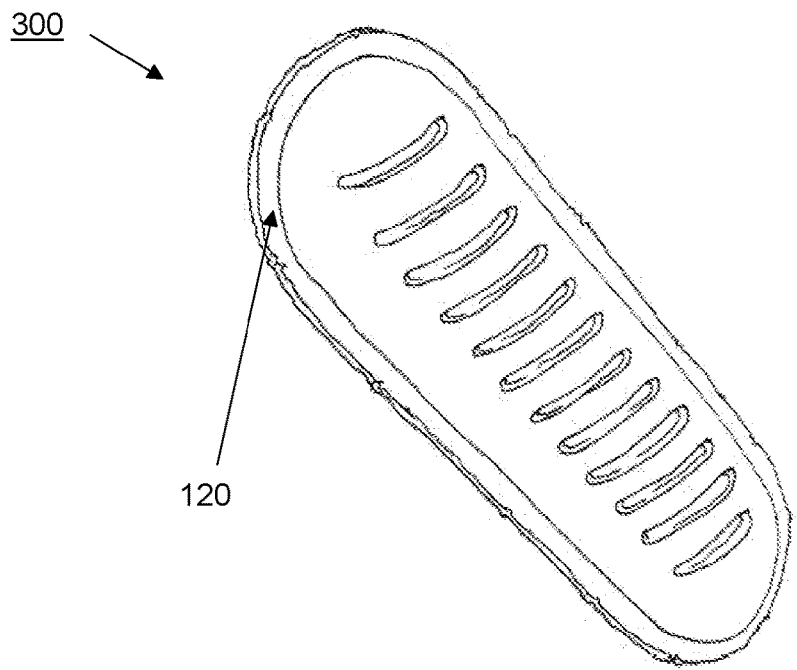
FIG. 3 illustrates a sandwich prepared using the food preparation device according to the present invention.

According to another aspect herein, there is provided a sandwich comprising a first piece of bread 140A and a second piece of bread 140B similar to the first piece of bread 140A (see FIG. 1A), wherein each piece of bread comprises a bottom unit surrounded by a flat edge 120 extending outwardly the circumference of the bottom unit(s) and said flat edges 120 are provided with an edible and organic adhesive layer for enabling the sealing together of the two pieces of bread along the flat edges during preparation of the sandwich in the food preparation device 100 according to the present invention. A side view of a sandwich 300 prepared using the device 100 (or the bread mold 200) is shown in FIG. 3. As shown the two pieces of bread are sealed together or glued together along the edges 120, forming a sandwich, thereby avoiding any leakage of the content of the sandwich before consumption.

The present invention is not to be considered limited to the precise construction disclosed. Various adaptations, modifications and uses of the invention may occur to those skilled in the art to which the invention relates and the intention is to cover hereby all such adaptations, modification and uses which fall within the scope of the appended claims.

The invention claimed is:

1. A food preparation device for sealing together two pieces of bread, the device comprising:
   - a bottom unit for accommodating the first piece of bread having the same form as the bottom unit;
   - a top unit for accommodating the second piece of bread having the same form as the top unit;
   - the bottom unit and the top unit each comprising a horizontally flat edge along the circumference of the bottom unit respectively and the circumference of the top unit, respectively;
   - the top unit being movable from an open position to a closing position for enabling the sealing together of the two pieces of bread along a flat edge of the first piece of bread and a flat edge of the second piece of bread, wherein the flat edge of the first piece of bread and the flat edge of the second piece of bread are provided with an edible and organic adhesive layer for enabling the sealing together of the two pieces of bread along the flat edges, thereby avoiding an edible filling content of the sealed bread from leaving the bread before consumption;
   - wherein the top unit and the bottom unit having a plurality of openings evenly distributed over the surface of the top unit and the bottom unit, respectively;
   - a water tank for storing water; and
   - at least one water pump connected to the water tank, the at least one water pump configured to deliver a spray of water through the plurality of openings of the top unit and the bottom unit.

2. The food preparation device according to claim 1, wherein the bottom unit and the top unit each are provided with a heating unit.

3. The food preparation device according to claim 2, wherein the flat edge has a width of at least 0.5 cm.

4. The food preparation device according to claim 1, wherein the flat edge has a width of at least 0.5 cm.

5. The food preparation device according to claim 1, further comprising a controller, wherein the water is sprayed through the holes on the top layer of the first and second pieces of bread in a manner controlled by the controller and in regular intervals during the preparation of the bread such that the top layer of the pieces of bread gets crispy.

6. The food preparation device according to claim 5 wherein the controller is one of automatically and manually controlled.

* * * * *